United States Patent [19]

Wakamatsu et al.

[11] 3,728,553

[45] Apr. 17, 1973

[54] SPEED DETECTING SYSTEM UTILIZING DIGITAL LOGIC CIRCUITRY

[75] Inventors: Hisato Wakamatsu; Shigeyuki Akita, both of Kariya, Japan

[73] Assignee: Nippondenso Co., Ltd., Kariya-shi, Aichi-ken, Japan

[22] Filed: July 29, 1971

[21] Appl. No.: 167,277

[30] Foreign Application Priority Data

Aug. 3, 1970 Japan ................................. 45/67924

[52] U.S. Cl. .................. 307/231, 307/218, 307/233, 307/234, 324/78 Q, 324/161, 328/140
[51] Int. Cl. ............................ H03k 5/20, G01p 3/56
[58] Field of Search ...................... 307/231, 233, 234, 307/215, 218; 328/140; 324/78 Q, 161; 123/102

[56] References Cited

UNITED STATES PATENTS

| 3,340,951 | 9/1967 | Vitt | 324/161 X |
| 3,521,174 | 7/1970 | Naubereit et al. | 324/161 X |
| 3,146,432 | 8/1964 | Johnson | 324/161 X |

FOREIGN PATENTS OR APPLICATIONS

| 1,266,035 | 4/1968 | Germany | 324/161 |

*Primary Examiner*—Stanley D. Miller, Jr.
*Attorney*—Cushman, Darby & Cushman

[57] ABSTRACT

A speed detecting system for vehicles for detecting whether the instantaneous vehicle speed has reached a preset reference vehicle speed in terms of signals "1" and "0". In this system, the instantaneous vehicle speed is converted into a digital signal, and the entire operation is digitally performed.

2 Claims, 2 Drawing Figures

SPEED DETECTING SYSTEM UTILIZING DIGITAL LOGIC CIRCUITRY

BACKGROUND OF THE INVENTION

1. Field of the Invention

This invention relates to speed detecting systems for vehicles for detecting whether or not the instantaneous vehicle speed has reached a preset reference vehicle speed.

2. Description of the Prior Art

In the usual speed detecting systems for vehicles, to which the invention pertains, the instantaneous vehicle speed is converted into a corresponding d-c voltage by rectifying and smoothing an a-c voltage proportional to the instantaneous vehicle speed produced by an a-c generator having an armature coupled to the wheel shaft of the vehicle, and the d-c voltage thus produced is compared with the breakdown voltage of a constant voltage diode selected to correspond to a preset reference vehicle speed or with the base-emitter conduction voltage of a switching transistor selected to correspond to the preset reference vehicle speed to discriminate whether the instantaneous vehicle speed has reached the reference vehicle speed.

In the above type of the usual speed detecting systems, however, the d-c voltage produced by rectifying and smoothing the a-c output of the a-c generator still contains an appreciable ripple component and may not exactly correspond to the instantaneous vehicle speed, so that the comparison of the ripple level with the preset breakdown voltage of the constant voltage diode or the preset base-emitter conduction voltage of the switching transistor leads to malfunctioning of the system.

Also, when a constant voltage diode is used, its specific resistance varies with the varying ambient temperature, so that the breakdown voltage fluctuates to vary the reference point. Likewise, with the switching transistor the base-emitter conduction voltage varies with ambient temperature to fluctuate the detection point.

SUMMARY OF THE INVENTION

An object of the invention is to provide a speed detecting system for vehicles comprising a vehicle speed pulse generator to produce a train of pulses each having a pulse length corresponding to the instantaneous vehicle speed, a monostable multi-vibrator triggered by a trigger signal obtained from the pulse output of said vehicle speed pulse generator, said monostable multi-vibrator producing a train of pulses having a fixed pulse length corresponding to a preset reference vehicle speed, a logic circuit to take the logic product of the pulse output of said vehicle speed pulse generator and the pulse output of said monostable multi-vibrator, a first memory consisting of a flip-flop opening a gate and registering the pulse output of said logic circuit in synchronism with the leading edge or trailing edge of output pulses of said monostable multi-vibrator, and a second memory consisting of a flip-flop opening a gate and changing the memory content of said first memory into a d-c signal in accordance with a signal synchronized to the leading edge or trailing edge of output pulses of said monostable multi-vibrator.

According to the invention, whether the instantaneous vehicle speed has reached the reference vehicle speed may be known exactly from the signal "1" or "0" of the second memory. Also, since the system operates entirely digitally, its response is very rapid. Further, malfunction due to changing ambient temperature is eliminated. Furthermore, the integration of the circuit, particularly into MSI, is facilitated, so that the size of the entire system may be made extremely small.

The above and other objects, features and advantages of the invention will become more apparent from the following description, when read with reference to the accompanying drawing.

DESCRIPTION OF THE PREFERRED EMBODIMENT

Figure 1:
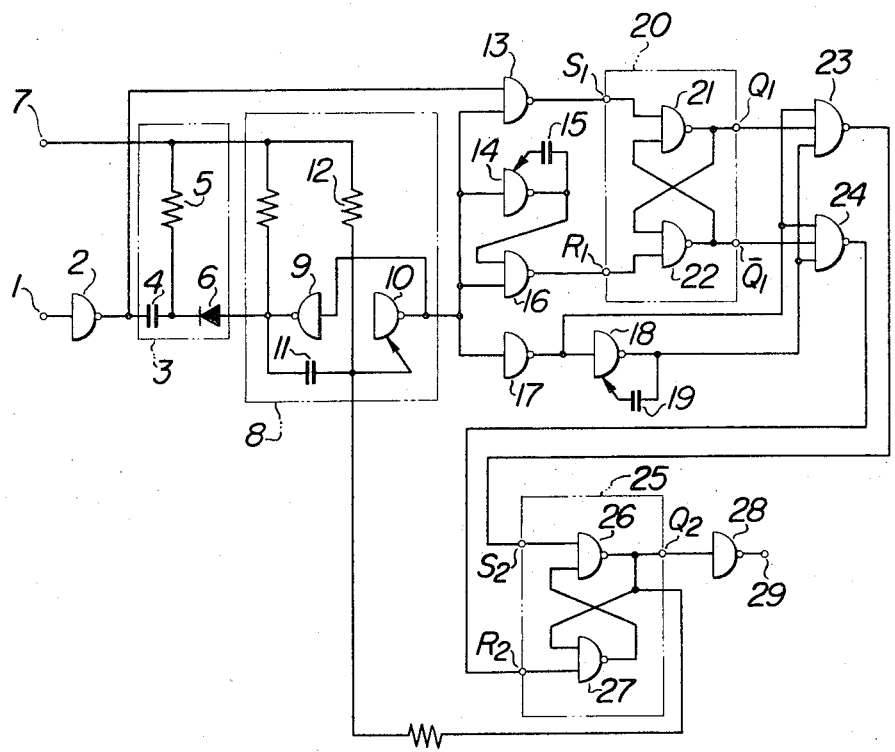
FIG. 1 is a circuit diagram showing an embodiment of the speed detecting means for vehicles according to the invention.

Referring to FIG. 1, which shows one embodiment of the invention, reference numeral 1 designates an input terminal, on which is impressed a train of pulses having a pulse length corresponding to the instantaneous vehicle speed (hereinafter referred to as instantaneous vehicle speed pulse). The vehicle speed pulse is produced from a vehicle speed pulse generator, which may comprise a rotary permanent magnet and a lead switch disposed adjacent thereto. The rotary permanent magnet may be mounted on a shaft geared with a wheel shaft, for instance a wheel shaft at the output of the transmission. The permanent magnet is rotated in proportion to the vehicle speed to on-off operate the lead switch, thereby producing a pulse train with the pulse length of each pulse corresponding to the instantaneous vehicle speed.

The polarity of the vehicle speed pulse impressed on the input terminal 1 is inverted by a NAND element 2, and then fed to a differential circuit 3, which comprises a capacitor 4, a resistor 5 and a diode 6 and differentiates the inverted vehicle speed pulses. The differentiated pulse output of the NAND element 2 is sent out as a trigger signal to the succeeding stage. Reference numeral 7 designates a power supply terminal. Reference numeral 8 designates a monostable multi-vibrator comprising NAND elements 9 and 10, a capacitor 11 and a resistor 12. It provides a train of pulses having a constant pulse length corresponding to a preset reference vehicle speed (hereinafter referred to as reference vehicle speed pulse). The pulse length of the reference vehicle speed pulse is determined by the time constant for the circuit of capacitor 11 and resistor 12. A NAND element 13 takes the NAND (negation of logic product) of the output of the NAND element 2 and the reference vehicle speed pulse output of the monostable multi-vibrator 8. The output of the monostable multi-vibrator 8 is also coupled to an inverter 14 using a NAND element, which together with a capacitor 15 connected between its output terminal and its expander terminal constitute a delay line. A NAND element 16 takes the NAND of the output of the inverter 14 and the pulse output of the reference vehicle speed pulse output of the monostable multivibrator 8. An inverter 17 using a NAND element inverts the polarity of the reference vehicle speed pulse from the monostable multi-vibrator 8. The output of the inverter 17 is coupled to a delay line consisting of a NAND element 18 and a capacitor 19 connected between the output terminal and expander terminal thereof. Reference numeral 20 designates a first memory consisting of an S-R flip-flop having NAND elements 21 and 22. It has a set terminal $S_1$, a reset terminal $R_1$ and corresponding output terminals $Q_1$ and $\overline{Q}_1$. Numerals 23 and 24 designate respective NAND elements. Numeral 25 designates a second memory consisting of an S-R flip-flop of NAND elements 26 and 27 in pair. It has a set input terminal $S_2$, a reset input terminal $R_2$ and an output terminal $Q_2$, which is connected to an inverter 28 using a NAND element, which is in turn connected to an output terminal 29.

Figure 2:
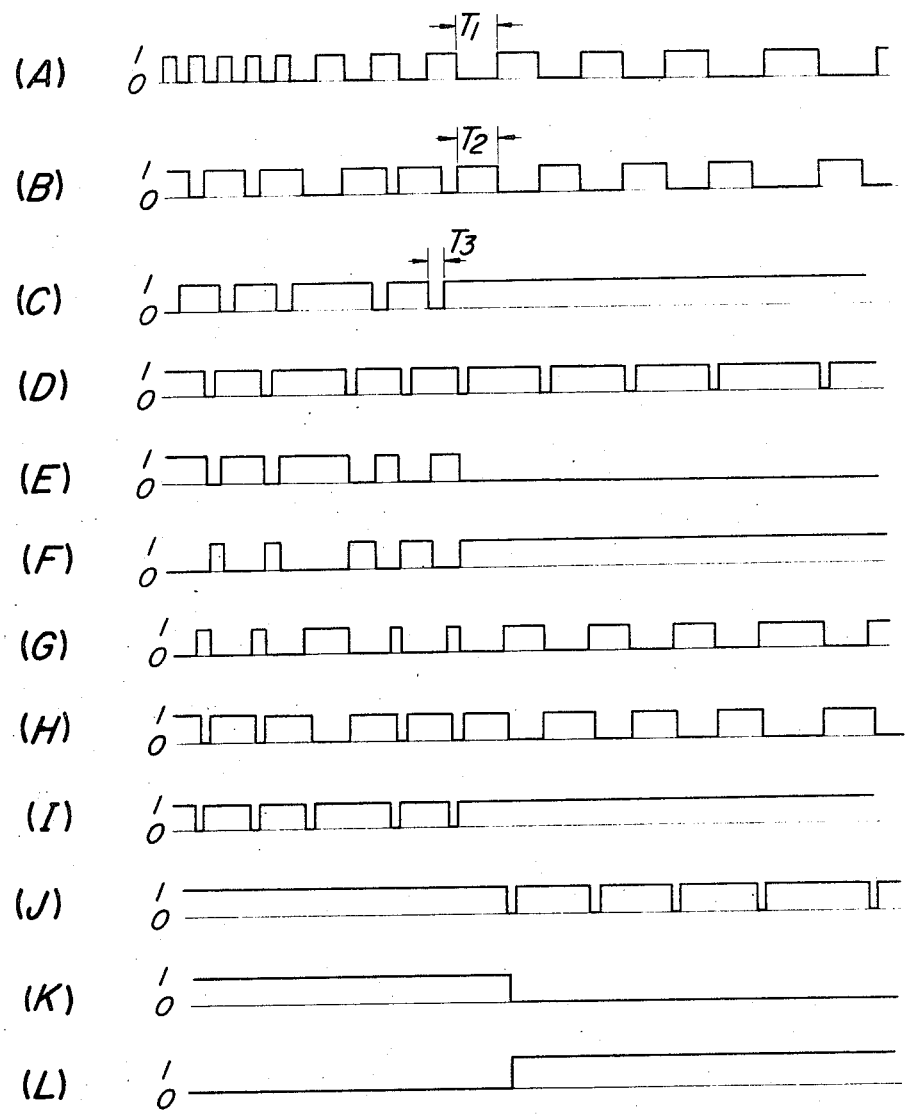
FIG. 2 is a waveform chart showing waveforms A through L to illustrate the operation of the speed detecting means according to the invention.

FIG. 2 shows waveforms of the outputs of various parts in the circuit of FIG. 1, namely the waveform of the pulse output of the inverter 2 at (A), the waveform of the reference vehicle speed pulse output of the monostable multi-vibrator 8 at (B), the waveform of the pulse output of the NAND element 13 at (C), the waveform of the pulse output of the NAND element 16 at (D), the waveform of the pulse output at the output terminal $Q_1$ of the first memory 20 at (E), the waveform of the pulse output at the output terminal $\overline{Q}_1$ of the memory 20 at (F), the waveform of the pulse output of the inverter 17 at (G), the waveform of the pulse output of the inverter 18 at (H), the waveform of the pulse output of the NAND element 23 at (I), the waveform of the pulse output of the NAND element 24 at (J), the waveform of the pulse output at the output terminal $Q_2$ of the second memory 25 at (K), and the waveform of the pulse output of the inverter 28 at (L).

The operation of the circuit described above according to the invention will now be described. As the vehicle speed pulse generator delivers instantaneous vehicle speed pulses to the input terminal 1, the inverter 2 inverts the input pulse train and produces the inverted pulse train as shown at (A) in FIG. 2. In the following description, the presence of voltage is referred to as signal "1" and the absence of voltage is referred to as signal "0". In the chart of FIG. 2, the voltage level and the zero level of the individual waveforms are respectively labeled "1" and "0". The instantaneous vehicle speed pulses from the inverter 2 are differentiated by the differential circuit 3, which produces negative differentiated pulses to trigger the monostable multi-vibrator 8. Upon triggering of the monostable multi-vibrator 8, it provides a reference vehicle speed pulse of a fixed pulse length corresponding to the reference vehicle speed as shown at (B) in FIG. 2. The NAND element 13, which takes the NAND of the instantaneous vehicle speed pulse output of the inverter 2 and the reference vehicle speed pulse output of the monostable multi-vibrator 8, produces a pulse output as shown at (C) in FIG. 2. The interval of signal "0" in each cycle of the waveform of the instantaneous vehicle speed pulse output ((A) in FIG. 2) is denoted by $T_1$, the interval of signal "1" in each cycle of the waveform of the reference vehicle speed pulse output ((B) in FIG. 2) by $T_2$, and the interval of signal "0" in each cycle of the waveform of the pulse output of the NAND element 13 ((C) in FIG. 2) by $T_3$. The interval $T_2$ is determined by the time constant for the circuit of capacitor 11 and resistor 12 in the monostable multi-vibrator 8. When the instantaneous vehicle speed is zero, $T_1$ is infinite and $T_3$ is zero, and the NAND element 13 continuously provides signal "1". When $T_1 \geq T_2$, the output of the NAND element 13 continues to be "1". As soon as $T_1$ becomes shorter than $T_2$, the condition of $T_3 > 0$ occurs, so that the output of the NAND element 13 becomes alternately "1" and "0". The pulse output of the NAND element 13 appears at the set terminal $S_1$ of the first memory 20, while the pulse output of the NAND element 16 ((D) in FIG. 2) synchronized to the leading edge of the reference vehicle speed pulse of the monostable multi-vibrator 8 appears at the reset terminal $R_1$ of the first memory 20. Thus, the first memory 20 opens its gate according to its input to the reset terminal $R_1$ and registers what signal prevails at the output terminal of the NAND element 13 according to its input to the set terminal $S_1$. It provides outputs shown at (E) and (F) at the respective output terminals $Q_1$ and $\overline{Q}_1$. It will be seen from the waveforms of the outputs shown at (E) and (F) in FIG. 2, that while the instantaneous vehicle speed is lower than or equal to the reference vehicle speed ($T_1 \geq T_2$), the first memory 20 continuously provides signal "0" at its output terminal $Q_1$ while continuously providing signal "1" at its other output terminal $\overline{Q}_1$. On the other hand, if the instantaneous vehicle speed is higher than the reference vehicle speed ($T_1 < T_2$), it provides the signals "1" and "0" at the respective output terminals $Q_1$ and $\overline{Q}_1$.

The inverter 17 inverts the reference vehicle speed pulse output of the monostable multi-vibrator 8 to produce a pulse train as shown at (G) in FIG. 2, which is fed to the delay line of inverter 18 and capacitor 19 to obtain a pulse train as shown at (H) in FIG. 2. The NAND element 23 takes the NAND of the output from the output terminal $Q_1$ of the first memory 20, the pulse output of the inverter 17 and the pulse output of the inverter 18, and it produces the pulse output shown at (I) in FIG. 2, with the trailing edge synchronized to the trailing edge of the reference vehicle speed pulse ((B) in FIG. 2) of the monostable multi-vibrator 8. The NAND element 24 takes the NAND of the output from the output terminal $\overline{Q}_1$ of the first memory 20, the pulse output of the inverter 17 and the pulse output of the inverter 18, and it produces the pulse output shown at (J) in FIG. 2, with the trailing edge synchronized to the trailing edge of the reference vehicle speed pulse of the monostable multi-vibrator 8. The pulse output of the NAND element 23 appears at the set terminal $S_2$ of the second memory 25, while, the pulse output of the NAND element 24 appears at the reset terminal $R_2$ of the memory 25. The second memory 25 thus provides at its output terminal $Q_2$ the output shown at (K) in FIG. 2, which is inverted by the inverter 28 to obtain the output shown at (L) in FIG. 2 appearing at the output terminal 29. It will be seen from the waveform (L) in FIG. 2 that, if the instantaneous vehicle speed is lower than or equal to the reference vehicle speed ($T_1 \geq T_2$), signal "1" continuously appears at the output terminal 29, while if the instantaneous vehicle speed is higher than the reference vehicle speed ($T_1 < T_2$), signal "0" continuously appears at the output terminal 29. Thus, whether the instantaneous vehicle speed has reached the reference vehicle speed can be known from the signal "1" or "0" appearing at the output terminal 29.

It is to be understood that the foregoing embodiment is by no means limited, but that various changes and modifications may be made. For example, some or all of the NAND elements in the foregoing embodiments may be replaced with a suitable combination of other elements such as AND, OR and NOR elements. Also, it is possible to entirely reverse the polarity, of the individual outputs noted above involved in the foregoing embodiment.

We claim:

1. In a speed detecting system the improvement comprising a speed pulse generator for producing a train of speed representative pulses (A) each having a pulse length corresponding to the instantaneous speed, means connected to said generator and including a monostable multivibrator (8) triggered by a trigger signal obtained from the said pulses (A) of said speed pulse generator for producing a train of speed reference pulses (B) having a fixed pulse length corresponding to a preset reference speed, logic circuit means (13) connected to said generator and multivibrator for producing a logic product signal (C) representing the logical product of said speed representative pulses (A) from said vehicle speed pulse generator and said speed reference pulses (B) from said monostable multivibrator, said logic product signal (C) being in the form of pulses only when the time between said speed representative pulses (A) is less than the duration of respective speed reference pulses (B), a flip flop (20) having set and reset inputs and respective first and second outputs, said set input being connected to said logic circuit means for starting respective output signals (E) at said first output in response to said logic product pulses, inverting delay means (14, 15) connected to said multi-vibrator for producing inverted delayed speed reference pulses, second logic circuit means (16) connected to said delaying means and said multivibrator for producing second logic product signals (D) which are the logical product of said speed reference pulses from said multivibrator and said inverted delayed speed reference pulses, and means connecting said second logic circuit means (16) to said flip flop (20) at said reset input for resetting said flip flop and ending the said respective output signals (E) at said first output of said flop flop respectively in response to said second logic product signals (D).

2. A system as in claim 1 and further including:

a second flip flop (25) having set and reset inputs and an output for producing a binary level signal, means (17) connected to said multivibrator for developing inverted speed reference pulses (G), second inverting delay means (18, 19) connected to said last mentioned means for producing second inverted delayed speed reference pulses (H), third (23) and fourth (24) logic circuit means connected to the last two mentioned means and respectively to said first and second outputs of the first mentioned flip flop for producing:

1. a third logic product signal (I) representing the logical product of said first flip flop output signals (E) and of said inverted speed reference pulses (G) and of said second inverted delayed speed reference pulses (H), and 2. a fourth logic product signal (J) representing the logical product of said inverted speed reference pulses (G) and of said second inverted delayed speed reference pulses (H) and of the inversion (F) of said first flip flop output signals (E), and means connecting said third and fourth logic product signals (I) and (J) respectively to said set and reset inputs of said second flip flop (25) for causing said output signal thereof to change its binary level to one direction only when said instantaneous speed becomes greater than said preset reference speed and to the other direction only when the said instantaneous speed decreases to equality with said reference speed or is below the reference speed.

* * * * *